United States Patent [19]

Hancock

[11] 4,111,449

[45] Sep. 5, 1978

[54] BUMPER HITCH FOR TOWING MOTORCYCLES

[76] Inventor: Charles Lee Hancock, 2545 E. Linda Cir., Phoenix, Ark. 85024

[21] Appl. No.: 837,698

[22] Filed: Sep. 29, 1977

[51] Int. Cl.² .............................................. B62D 53/04
[52] U.S. Cl. .................... 280/402; 280/292; 280/490 R; 280/502
[58] Field of Search ................. 280/402, 292, 460 R, 280/460 A, 490 R, 490 A, 502

[56] References Cited

U.S. PATENT DOCUMENTS

| 1,581,515 | 4/1926 | Coolican | 280/402 |
| 2,050,518 | 8/1936 | Baumgardner | 280/490 R |
| 3,018,117 | 1/1962 | Bechard | 280/490 R |
| 3,713,672 | 1/1973 | Robbins | 280/402 |
| 3,776,572 | 12/1973 | Bane | 280/402 |

Primary Examiner—Robert R. Song
Assistant Examiner—R. Schrecengost
Attorney, Agent, or Firm—Warren F. B. Lindsley

[57] ABSTRACT

A quick detachable bumper hitch for towing a motorcycle employing manually operated means for raising and lowering the front wheel of the cycle to maintain a given relationship with the road surface on which the rear wheel of the motorcycle is being supported.

5 Claims, 14 Drawing Figures

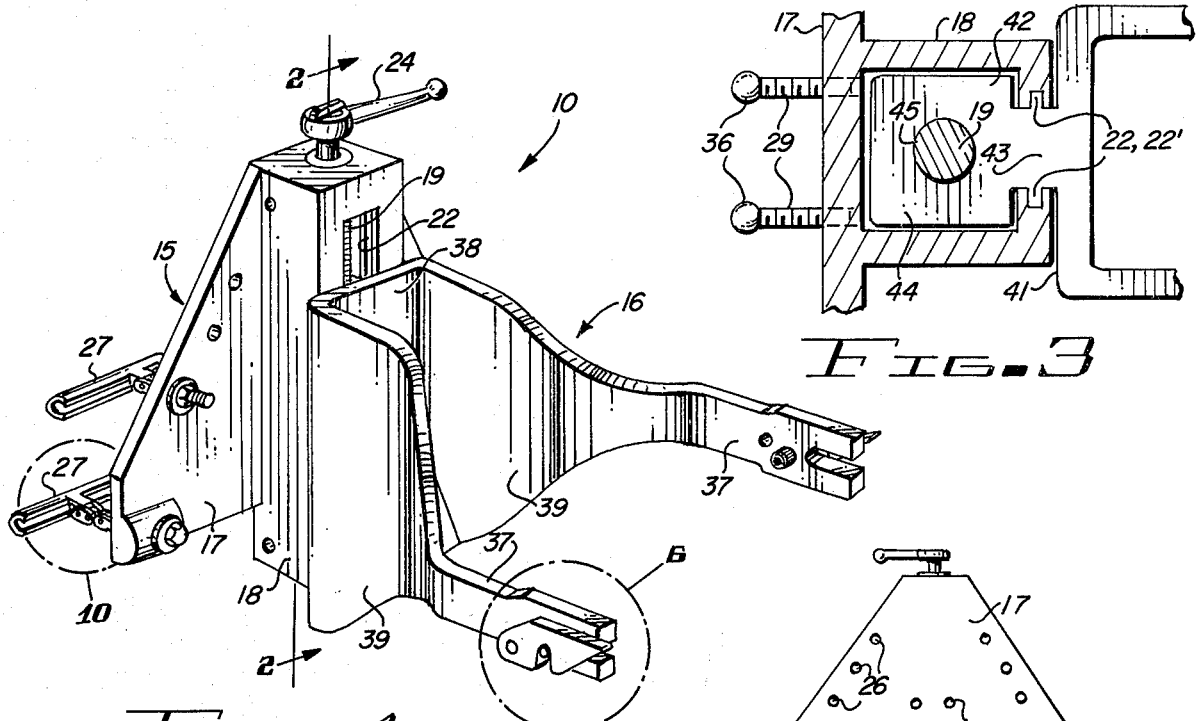
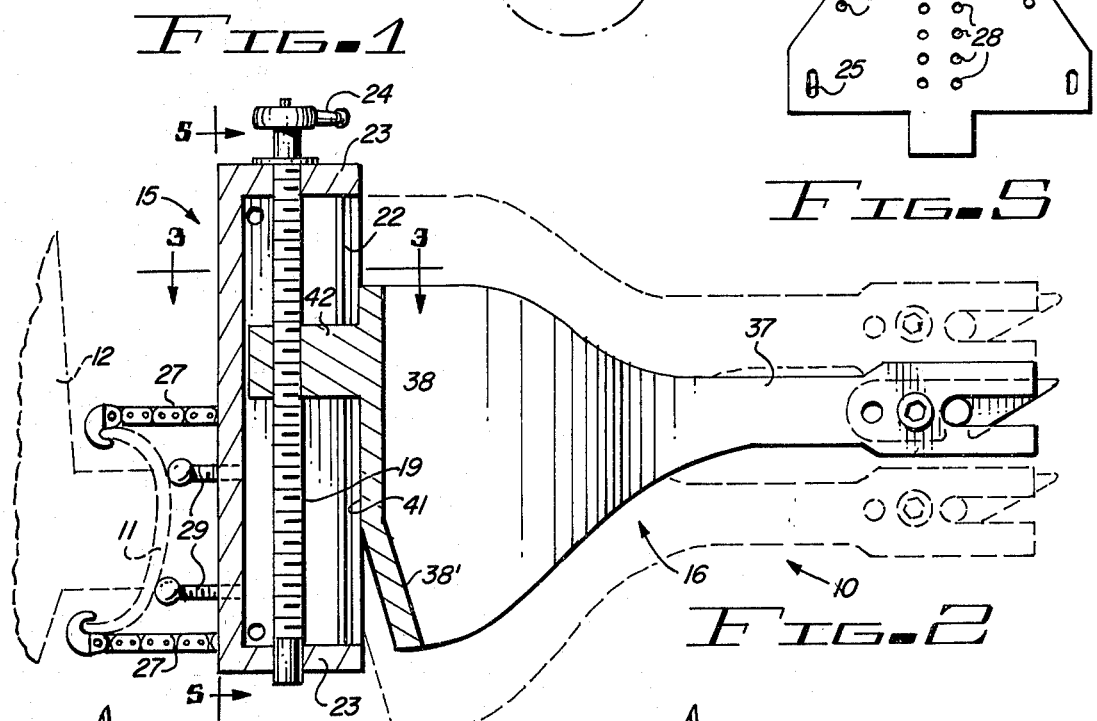
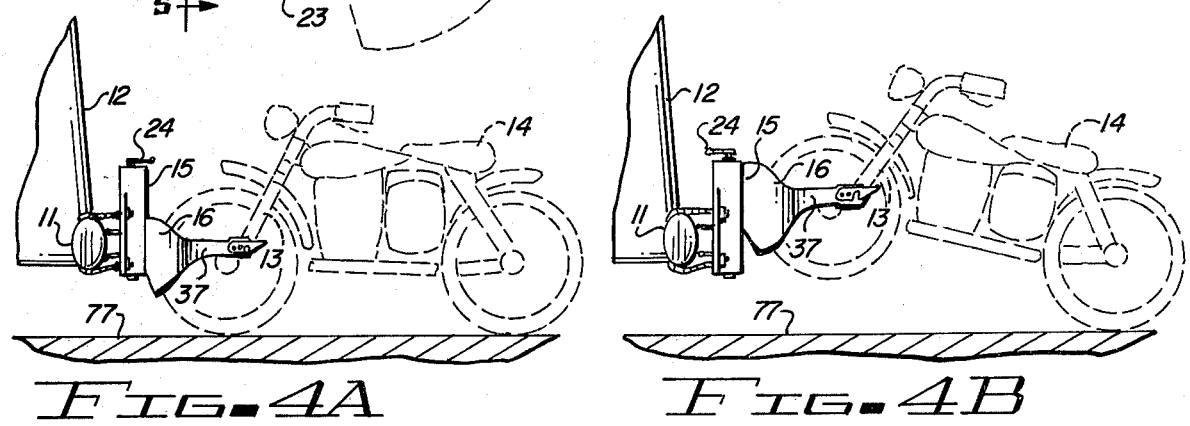

4,111,449

BUMPER HITCH FOR TOWING MOTORCYCLES

BACKGROUND OF THE INVENTION

This invention relates to towing hitches for motorcycles having means for lifting the front wheel of the motorcycle from the road surface in preparation for towing, maintaining such angular relationship with the rear wheel during the towing operation and lowering the same to the level of the road surface on which the rear wheel is resting at the end of the tow. Means are provided for quickly releasing the motorcycle from its connection with the hitch in readiness for riding.

FIELD OF THE INVENTION

This invention is particularly directed to a sturdy, lightweight bumper hitch for towing motorcycles or the like, centered longitudinal with the rear of the towing vehicle and comprising two basic components, namely a hitch support portion which is detachably mounted on the vehicle's rear bumper and a rearwardly extending tow-bar portion detachably secured in wheel straddling relationship to the depending sides of the motorcycle's steering fork. The hitch includes a vertically extending center post which is integral with the hitch support portion and contains operating means for vertically reciprocating the integrally connected tow-bars to raise or lower the front wheel of the motorcycle relative to the road surface upon which the rear wheel is resting.

DESCRIPTION OF THE PRIOR ART

Heretofore, several types of bumper hitches have been designed, manufactured and utilized for towing a motorcycle at the rear of a motor vehicle such as a passenger car, pick-up truck or camper. These devices use the principle of attaching the hitch support elements of the device in centered spaced relationship to the rear bumper of the towing vehicle and a pair of tow-bars to the front wheel, fork or other forward part of the motorcycle. The front ends of the tow-bars are arranged in pivoted relationship to the hitch support elements mounted on the bumpers to complete the hitch connection for towing the motorcycle in upright longitudinal relationship with both front and rear wheels on the road.

Some of these hitches have been provided with manually actuated lever means for lifting and holding the front wheel and associated parts of the motorcycle off of the ground or road surface so that the towing operation can be performed with the rear wheel only riding on the road surface.

These bumper hitches have several inherent disadvantages including:

a. The method of securing the hitch support portion to the bumper which is not universal and cannot be installed easily on bumpers of various size and shape without making extensive alterations to the basic hitch support itself or drilling into the bumper.

b. The methods of maintaining the stability of the cycle especially when the cycle is being towed in an upright position with both wheels riding on the road surface usually resulting in poor tracking of the cycle behind the towing vehicle and severe scuffing damage to its tires.

c. The means and methods used for raising the front wheel of the motorcycle off of the road or ground surface usually consisting of manually operating levers connected between some parts of the front wheel structure and the rearwardly extending tow-bars. The prior art arrangement requires extra long levers for raising the front end of a 400 to 500 pound motorcycle off of the ground surface and when said lever arrangement is connected directly to the wheel of a motorcycle, it can result in severe damage to the same. It also requires considerable time and effort in disconnecting the apparatus from the wheel when the cycle is lowered to be ridden in the normal manner.

The prior art is represented by U.S. Pat. Nos. 3,713,672 and 3,776,572.

In order to obviate the above disadvantages of the prior art, a new and improved bumper hitch for towing motorcycles is provided which is light in weight, sturdy, inexpensive to manufacture and quick and easy to install on rear bumpers of most any vehicle having manually operable means for raising and lowering the front end and wheel of the motorcycle from or to the ground surface and means for quickly attaching or detaching the motorcycle from the hitch for towing or riding purposes.

SUMMARY OF THE INVENTION

It is, therefore, one object of this invention to provide an improved bumper hitch for towing a motorcycle from the rear of a towing vehicle.

Another object of this invention is to provide an improved bumper hitch for towing a motorcycle that employs a universal bumper hitch support and connecting member which may be quickly and easily installed in rigid secured relationship on the rear bumper of a towing vehicle regardless of the shape, size, height or configuration of the bumper.

A further object of this invention is to provide an improved bumper hitch for towing a motorcycle that includes a quickly detachable arrangement of its components for connecting a tow-bar portion of a bumper hitch support member to the front steering fork member of the motorcycle frame.

A still further object of this invention is to provide an improved bumper hitch for towing a motorcycle having means for providing the necessary force to lift and hold the front end and wheel assembly of the motorcycle off of the road surface upon which the rear wheel is resting or riding.

A still further object of this invention is to provide a bumper hitch for towing a motorcycle that utilizes the same manually operated means for raising the front end of the motorcycle from the road surface and to again lower said front end wheel of the motorcycle into contact with the road surface.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing, in which:

FIG. 1 is a perspective view showing the bumper hitch assembly comprising its two component parts as it would appear when removed from its connection to the rear bumper of a towing vehicle and the front frame portion of a motorcycle.

FIG. 2 is a vertical sectional view taken on the line 2—2 of FIG. 1 showing the separable connection between the bumper hitch support portion and the tow-bar portion of the device and illustrating one means for raising and/or lowering the tow-bar portion.

FIG. 3 is a cross-sectional view of FIG. 2 taken along the line 3—3.

FIG. 4A is a side view of the structure shown in FIG. 1 connected to the rear bumper of a towing vehicle and with the fork of a motorcycle shown in dash lines positioned with its front wheel between the forks of the bumper hitch at ground level.

FIG. 4B is a view similar to FIG. 4A with the front wheel of the motorcycle elevated in towing position.

FIG. 5 is a plan view of the attachment plate of the bumper hitch which is positioned adjacent the towing vehicle.

DESCRIPTION OF THE PREFERRED EMBODIMENT

Figure 9:
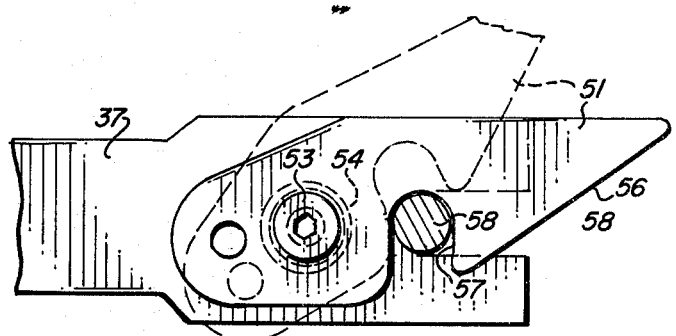
FIG. 9 is a fragmentary side elevational view of the rear end portion of one of the tow-bars showing the spring-loaded cam members used for detachably securing their ends to projecting pivot pins at the sides of the motorcycle front fork members.

Referring more particularly to the various views of the drawings for a more detailed description of the construction and other features of the invention, FIGS. 1 and 2 illustrate a bumper hitch 10 connected in longitudinal towing relationship between the rear bumper 11 of a towing vehicle 12 and a front steering fork 13 of a motorcycle 14 shown in FIGS. 4A, 4B and 9 with the associated components of the hitch and the front end of the motorcycle in relationship to the ground or road surface on which the motorcycle is resting or being towed.

The bumper hitch 10 comprises two basic component parts in the form of separable assemblies that are preferably constructed of lightweight material such as an aluminum alloy the elements of which are welded together (as shown) or cast as separate contiguous units. These assemblies comprise a hitch support member 15 and a tow-bar member 16 which are demountably secured in rigid relationship to the rear bumper of the towing vehicle 12, the front steering fork 13 of the motorcycle, and to each other in longitudinal towing relationship.

The hitch support member 15 consists of a vertically disposed triangular member 17, the plane surface 18 of which is provided with a vertically extending tubular member for receiving longitudinally thereof a journaled screw 19.

Tubular member 18 has a rectangular cross-section. Its rearward surface has a slot or rectangular opening 21 which extends substantially from the lower to the upper end of member 18. The opposite vertical faces of the slot have centered grooves 22 extending from top to bottom. The upper and lower ends of member 18 are closed by horizontal plates 23 which provide bearing supports for the ends of screw 19. The upper end of screw 19 extends through upper plate 23 and attaches to a crank 24 which is employed to turn the screw 19.

Triangular member 17 is provided with slots 25 and holes 26 on the left- and right-hand sides for the attachment of bumper clamps 27. Two vertical rows or tapped holes 28 are provided near the center of member 17 to receive leveling studs 29.

Figure 10:
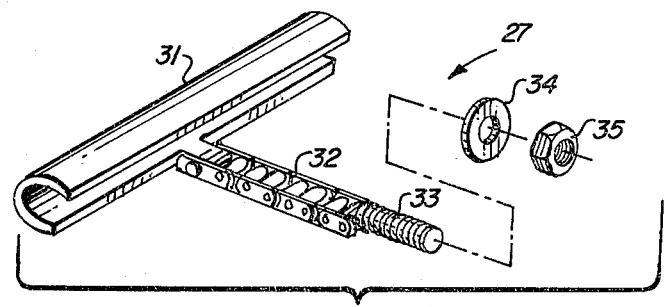
FIG. 10 is an enlarged exploded view of the portion of the bumper hitch showing in the circle 10 of FIG. 1.

As shown most clearly in FIG. 10, the bumper clamp 27 comprises a hook member 31, a chain 32 and a threaded stud 33. Member 31 is an elongated, U-shaped channel, one edge of which is preferably provided with a rubberized coating. One end of the chain 32 is attached to the uncoated edge of member 31, the other end of chain 32 terminates in the stud 33. Four of the clamps 27 are employed to attach the hitch support member 15 to bumper 11. Two of the hook members 27 are hooked over the top edge of bumper 11 at each side of member 15 and the other two hook members hook over the lower edge of bumper 11, one at each side. The studs 33 pass through the slots 25 and the holes 26 at appropriate locations relative to the edges of the bumper 11 and are secured by means of washers 34 and nuts 35. The leveling studs 29 are installed in the holes 28, their rubber-coated heads 36 extending forward toward the curved rear surface of bumper 11. Preferably four of the studs 29 are employed and are threaded to appropriate depths in holes 28 to cause the plate 17 to be oriented vertically when the clamps 27 are tightened by means of the nuts 35.

Tow-bar member 16 is in the form of a horizontally oriented wish-bone, its two spreading arms 37 extending rearwardly. The heavier center portion is in the form of a wide channel comprising a transverse center plate 38 and rearwardly extending side walls 39. The upper portion of plate 38 and the walls 39 are vertically oriented. The lower portion 38' of plate 38 is inclined rearwardly, and the relatively broad side walls 39 taper sharply to merge into the slender arms 37. The arms 37 are formed into straps of rectangular cross-section and carry at their terminations connecting means for securing the motor cycle 14 to the hitch 10.

Extending forward from the forward plane surface 41 of plate 38 is a screw block 42. Block 42 has a neck portion 43, the two opposite vertical sides of which carry tongues 22' which are dimensioned to mate slidably with the grooves 22 provided in opening 21 of member 18. The rectangular head portion 44 is dimensioned and proportioned to fit with clearance inside the tubular body of member 18 and is provided with a centered threaded hole 45 which receives the screw 19. The mounting of member 16 to member 15 with block 42 inside member 18, tongues 22' moving freely within grooves 22 and screw 19 threaded through hole 45 comprises a jack-screw which permits member 16 to be raised or lowered by the turning of crank 24.

The connecting means mentioned above for securing the motorcycle to the trailer hitch comprises a pair of spring-actuated cam members 51 pivotally mounted in horizontal transverse aligned relationship on the outer faces of the arms 37 of tow-bar member 16 in close proximity to their ends. These cam members are provided with open-ended longitudinally extending slots 52, the centers of which are in horizontal alignment with the centers of the mounting pins 53 about which the cam members 51 are caused to be rotated in a clockwise direction by means of compression springs 54. Springs 54 are interposed between the outer and inner faces of the legs of the tow-bars and the cam members 51.

The cam members 51 are shaped to provide finger gripping and cam surfaces 56 and radial-oriented, rounded end slots or cutouts 57 adjacent the forward ends of the cam surfaces 56. The cutouts 57 are of the same diameter as the open-ended slots 52 in the arms 37 of the tow-bar member 16 with both the cut-outs and slots being sized to receive and fit with slight clearance the diameters of suitable heavy duty tow-pins 58. Tow pins 58 extend outwardly, in horizontal transverse alignment from outer clamping plate members 59 (all shown in FIG. 7) adapted to be secured in a predetermined, aligned relationship to the depending legs of the front steering fork 13 of the motorcycle 14.

Figure 6:
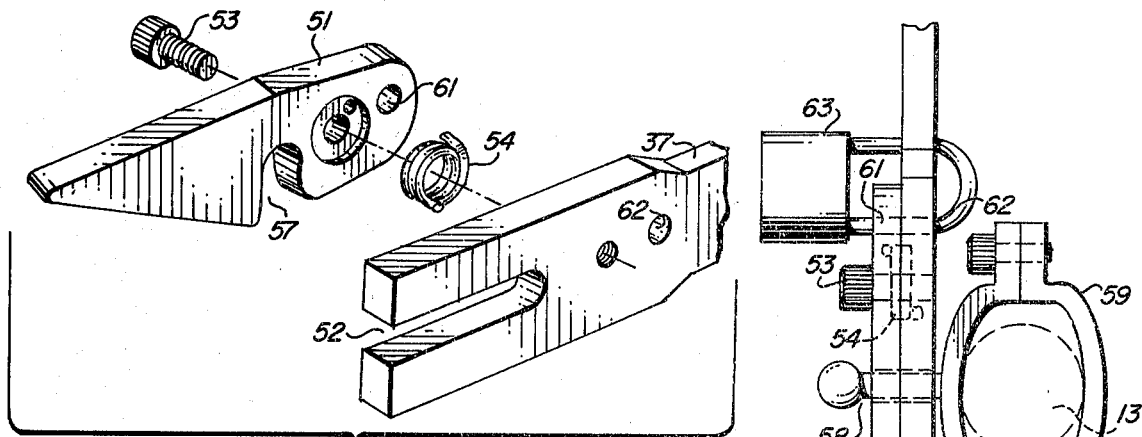
FIG. 6 is an exploded fragmentary view of the spring-loaded cam member shown in the circle marked 6 in FIG. 1 used for detachably connecting the ends of the tow bars to the sides of the motorcycle front fork members.
Figure 7:
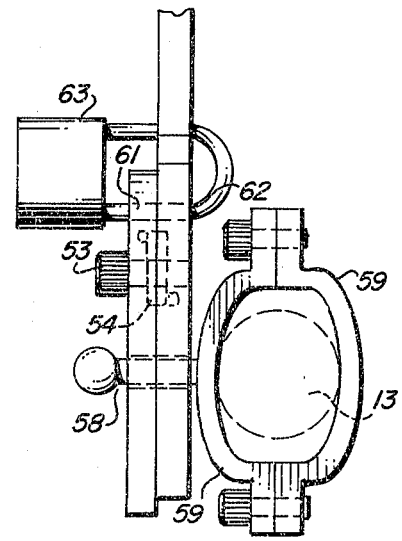
FIG. 7 is a partial top view of a locking mechanism for securing the motorcycle to the vehicle.

A hole 61 just rearward of pin 53 aligns with a hole 62 in arm 37 when cam 51 is in its lowered or clamping position about tow pin 58. The purpose of the aligned holes 61 and 62 is to permit the passing of the bar of a padlock 63 therethrough for security reasons as shown in FIG. 7.

Figure 8:
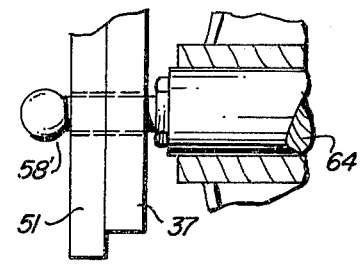
FIG. 8 is a partial cross-sectional view of the spring-loaded cam member shown in FIG. 6 attached to one end of the front axle of a motorcycle.

An alternative to the use of clamping plate members 59 for securing the tow pins 58 to the fork of the motorcycle is the use of tow pins 58' secured to the ends of the front axle 64 of the motorcycle as shown in FIG. 8. The tow pin 58' is gripped in the slot 52 of arm 37 by cam 51 as described earlier.

Figure 11:
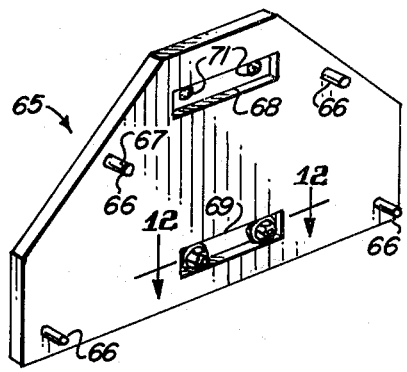
FIG. 11 is a perspective view of a special locking plate for mounting the hitch of FIGS. 1–10 to a vehicle or to a stationary post.
Figure 12:
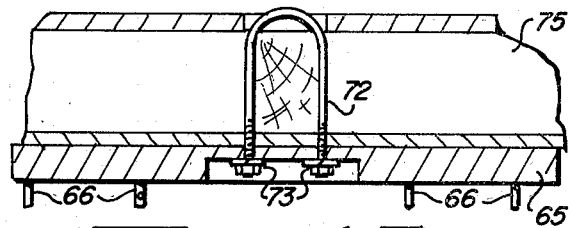
FIG. 12 is a cross-sectional view of the plate of FIG. 11 taken along the line 11—11 with the plate attached to the bumper of a truck.
Figure 13:
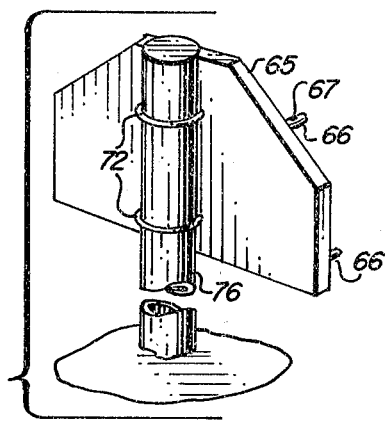
FIG. 13 is a perspective view showing the plate of FIG. 11 attached to a fixed post.

Alternate means for securing the hitch 10 to the rear of the towing vehicle or to a fixed stand are shown in FIGS. 11, 12 and 13.

FIG. 11 shows a special flat mounting plate 65 which conforms roughly in outline to member 17 of hitch 10. Extending perpendicularly from one surface of plate 65 are four pins 66 which are welded to or integral with plate 65. The four stud pins 66 are arranged to align with slots 25 and with two of the holes 26 of member 17, as most clearly shown in FIG. 5. The studs or pins may be smooth or threaded depending on the intended use of the plate 65. One of the pins 66 is pierced by a hole 67 to receive the bar of a padlock.

Two horizontal depressions 68 and 69 are centered on plate 65 and positioned one above the other. Two holes 71 at each end of each of the slots 68 and 69 are provided to receive a U-shaped clamp 72. The two threaded ends of the clamp 72 pass through the holes 71 from the side of plate 65 opposite the depressions 68 and nuts 73 are employed to draw the ends of the clamp 72 through the holes 71.

In FIG. 12, the plate 65 is shown clamped to a channel-type bumper 75 as commonly employed on trucks and similar vehicles. The clamp 72 surrounds a vertical post or stud which has been installed as an integral part of the bumper 75. The nuts 73 are tightened to secure the plate 65 to the bumper 75, and hitch 10 is mounted to plate 65 by means of pins 66 which are passed through slots 25 and two of the holes 26 of member 17. Nuts may be employed in the case of threaded pins 66 to secure the hitch 10 firmly in place.

FIG. 13 shows the plate 65 attached to a steel post 76 by means of the clamps 72. Mounted in this manner, the plate 65 provides a means for securely storing the hitch 10 when it is not in use. In this case, it is convenient to employ unthreaded pins 66 so that the hitch 10 may be quickly mounted to plate 65 by simply slipping the holes 26 and slots 25 over the pins 66 and securing it is place with the use of a padlock slipped through hole 67. A motorcycle may then be secured to the hitch 10 by means of the connection means involving the cam 56 and slot 52, utilizing a second padlock passed through holes 61 and 62 to secure the motorcycle to the hitch 10.

OPERATION AND USE OF THE INVENTION

It is evident from the foregoing description that a sturdy, lightweight bumper hitch for towing motorcycles consisting of only two basic component parts or assemblies has been devised that can be quickly and easily installed and connected in operative relationship between the rear bumper of a towing vehicle and the front frame portion of a motorcycle. The bumper hitch may be utilized to tow the motorcycle with only the rear wheel of the same in contact with the road surface.

The hitch 10 is first secured to the bumper 11 utilizing the clamps 27 and the leveling studs 29, or the alternative method employing the mounting plate 65. The mounting plate 65 may be permanently attached to the vehicle if desired, to permit the quick and easy mounting of the hitch 10 to the vehicle 12.

With the hitch 10 connected in towing relationship and the tow-bar member 16 in its lowermost position (as indicated in FIG. 4A), it is only necessary for the user to roll the motorcycle forward between the arms 37 until the outwardly extending tow pins 58 of the previously attached clamping plate members 59 enter the open-ended longitudinal slots 52 in the ends of the arms 37 in contact with the cam surfaces 56 of the pivoted cam members 51. This action results in counter-clockwise rotation of the cam members against the constant pressure of their compression springs 54 and permits the tow pins 58 to enter the radially disposed slots or cutouts 57 where the constant pressure exerted by springs 54 causes the cam members to be forcefully rotated in a clockwise direction, thereby locking the tow pins 58 in the semicircular ends of the slots 52 in the tow bars and the circular ends of the slots or cutouts 57 in the cam members 51, in connected towing relationship therewith. The member 16 and the connected front end of the motorcycle 14 may now be raised to the desired height above the ground or road surface 77 by operating the crank 24. FIG. 4B shows the front wheel raised to the desired height for towing.

To lower the front wheel of the motorcycle to a position level with the rear wheel and in contact with the road surface and to quickly detach the same from the tow bars and hence the hitch, it is only necessary for the user to reverse the simple procedure described in the preceding paragraphs.

Although but a few embodiments of the invention have been shown and described, it will be apparent to those skilled in the art that various changes and modifications may be made therein without departing from the spirit of the invention or from the scope of the appended claims.

What is claimed is:

1. A motorcycle bumper-mounted towing hitch comprising:
   a hitch support portion for detachably mounting on the rear bumper of a towing vehicle,
   a rearwardly extending tow-bar portion comprising a pair of tow-bars detachably securable in straddling relationship to the depending sides of a motorcycle steering fork,
   said hitch support portion comprises an integral center post angularly positioned relative to the ground,
   a first means for attaching said tow-bar portion to said center post for reciprocal movement longitudinally thereof,
   said tow-bar portion further comprising a channel member adapted to detachably receive and hold a portion of a front wheel of a motorcycle,
   detachably engaging clamping means one mounted at substantially the end of each tow-bar for engaging mounting pins projecting from the depending sides of the motorcycle steering fork,
   said clamping means comprising a pair of spring-actuated cam members pivotally mounted one adjacent the free end of each of said tow-bars,
   each of said clamping means being provided with an open-ended slot for receiving the mounting pins,
   said cam members being rotated by their springs about said pins after said pins enter said slots to hold the pins therein, and
   a second means mounted on said center post for selectively actuating said tow-bar portion along said center post to raise and lower the front wheel of a motorcycle.

2. The motorcycle bumper-mounted towing hitch set forth in claim 1 wherein:
   said second means comprises a shaft threadedly connected to and through an aperture in said center post and connected at one of its ends to said tow-bar portion, and
   a crank connected to the other end of said shaft for rotating said shaft.

3. The motorcycle bumper-mounted towing hitch set forth in claim 1 wherein:
   said center port comprises a hollow configuration having a slotted opening extending into the hollow of said center post arranged longitudinally of its length,
   said second means comprises a shaft threadedly connected to and through an opening in one end of said center post and connected within said hollow center position to one end of said tow-bar portion, and
   a crank connected to the other end of said shaft for rotating said shaft to raise and lower a wheel of a motorcycle connectable to said tow-bar portion.

4. The motorcycle bumper-mounting towing hitch set forth in claim 1 wherein:
   said center post is perpendicularly positioned relative to the longitudinal axis of said tow-bar portion.

5. The motorcycle bumper-mounted towing hitch set forth in claim 3 wherein:
   said tow-bar portion is threadedly attached to said shaft within the hollow configuration of said center post.

* * * * *